United States Patent Office 2,764,566
Patented Sept. 25, 1956

2,764,566

POLYISOCYANATE-ALKYD RESIN-SUBSTITUTED POLYMETHYLOL PHENOL CELLULAR COMPOSITIONS

Eli Simon, Los Angeles, and Frank W. Thomas, Burbank, Calif., assignors to Lockheed Aircraft Corporation, Burbank, Calif.

No Drawing. Application March 16, 1953,
Serial No. 342,752

17 Claims. (Cl. 260—2.5)

This invention relates to foaming reactant polyisocyanate-alkyd resin compositions and relates more particularly to the cellular plastic products of such reactant compositions, having improved resistance to elevated temperatures.

The cellular plastics obtained by the reaction of selected alkyd-resins and a polyisocyanate such as meta-toluene diisocyanate have found certain applications or uses in the various industries. However, these cellular plastics as heretofore produced soften and lose their strength at elevated temperatures and this characteristic has placed a definite limitation upon the usefulness of these products. For example a cellular plastic of this kind of ten pounds per cubic foot density and having an ultimate compressive strength of about 100 p. s. i. at a temperature of 250° F. is soft and has lost its compressive strength at 300° F. We have discovered that the heat resistance of this class of foamed or cellular plastics is materially increased by the incorporation of substituted polymethylol phenols in the reactant compositions or mixtures for producing the cellular plastics. Accordingly, it is an object of our present invention to provide for the production of cellular alkyd-resin polyisocyanate reaction products or plastics having good heat resistance characteristics. We have found that the inclusion of a substituted polymethylol phenol in a typical or given alkyd resin-meta-toluene diisocyanate reactant composition will greatly increase the heat resistance of the resultant cellular product.

Another object of the invention is to provide cellular plastic products of the class referred to that have substantially uniform cell structure, that have superior uniform as-foamed or as-poured adhesion and bond strength and that may be formulated to combine low apparent density with high physical strength characteristics. Furthermore heat resistant fillers, preferably of the fibrous types, may be incorporated in the reactant compositions to physically reenforce the resultant foams or cellular products.

The invention provides, generally, the preparation or mixing of an alkyd resin, a diisocyanate, a substituted polymethylol phenol, and if desired one or more fillers and/or foam stabilizing additives, the reaction of the resultant mixture, and the curing of the cellular reaction product at an elevated temperature.

The resins which we prefer to employ are alkyd resins, that is the reaction products of polyhydric alcohols and polybasic acids, unmodified or modified with oil and or other resins. The resins preferably have an acid number of from less than one to forty and have the following ratio range of the hydroxyl to the carboxyl groups in the resin reactants: From four hydroxyl (OH) to one carboxyl (COOH); to 1½ hydroxyl (OH) to one carboxyl (COOH). It may usually be preferred to employ alkyd resins having an acid number from less than one to thirty and wherein the ratio of the hydroxyl groups to the carboxyl groups is from three to one, to two to one. The following are formulae suitable for the preparation of alkyd resins adapted for employment in preparing the products of our invention, it being understood that the invention contemplates the use of other appropriate alkyd resins.

Resin A

| | Mols |
|---|---|
| Trimethylol propane | 4 |
| Adipic acid | 1 |
| Phthalic anhydride | ½ |
| Dimer acids | ½ |

The acid number of Resin A may be from thirty to less than one and is preferably from one to twenty.

Resin B

| | Mols |
|---|---|
| Trimethylol propane | 4 |
| Adipic acid | 2½ |
| Phthalic anhydride | ½ |

Resin C

| | Mols |
|---|---|
| Glycerol | 4 |
| Adipic acid | 2½ |
| Phthalic anhydride | ½ |

Resin D

| | Mols |
|---|---|
| Trimethylol ethane | 4 |
| Adipic acid | 1 |
| Phthalic anhydride | ½ |
| Dimer acids | ½ |

In Resin D selected or appropriate mixtures of trimethylol propane and trimethylol ethane may be employed in place of the trimethylol ethane.

Resin E

| | Mols |
|---|---|
| Trimethylol propane | 3 9/16 |
| Dimer acids | 1/16 |
| Oxalic acid | 2½ |

Resin F

| | Mols |
|---|---|
| Trimethylol propane | 4 |
| Adipic acid | 2 |
| Phthalic anhydride | ½ |
| Dimer acids | ½ |

Resin G

| | Mols |
|---|---|
| Trimethylol propane | 4 |
| Adipic acid | ½ |
| Phthalic anhydride | ½ |
| Maleic anhydride | ½ |
| Dimer acids | ½ |

Resin H

| | Mols |
|---|---|
| Trimethylol propane | 4 |
| Succinic acid | 1 |
| Phthalic anhydride | ½ |
| Dimer acids | ½ |

Resin I

| | Mols |
|---|---|
| Trimethylol propane | 4 |
| Phthalic anhydride | ½ |
| Itaconic acid | 1 |
| Dimer acids | ½ |

Resin J

| | Mols |
|---|---|
| Trimethylol propane | 3½ |
| Pentaerythritol | ½ |
| Adipic acid | 1½ |
| Phthalic anhydride | ½ |
| Dimer acids | ½ |

The acid numbers of Resins D to J inclusive may range from less than 1 to 30 but will preferably have an acid number of from 1 to 20.

The dimer acids or dimerized fatty acids included in certain of the above examples of alkyd resins are dimeric polymers of unsaturated fatty acids such as: Dimerized linolenic or linoleic acids. These dimer acids may be prepared by heating the methyl esters of polyunsaturated acids such as linoleic or linolenic acids at high temperatures. This is represented diagramatically by a Diels-Alder reaction to form the dilinoleic acid (dibasic unsaturated acid) as follows:

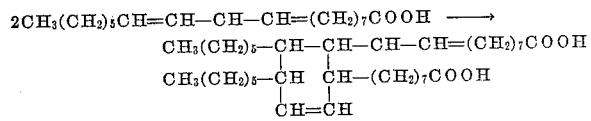

The polyisocyanate employed in preparing the reactant foaming compositions is preferably meta-toluene diisocyanate. The meta-toluene diisocyanate may be used either with or without one or more thermoplastic polymeric resin additives, the latter serving to stabilize the foam during the reaction, to increase the elasticity of the cell walls during the foaming of the mixture and for performing other functions productive of low density cellular products of good physical characteristics. We have found ethyl cellulose to be particularly effective as a resin additive and may use a commercial grade of ethyl cellulose that is soluble in the meta-toluene diisocyanate and wherein the ethoxyl content is from 43% to 50% and preferably from 45% to 49.5%. The viscosity of the ethyl cellulose which we employ is between 7 and 200 centipoises and preferably between 50 and 100 centipoises, the viscosity being determined on the basis of a 5% by weight concentration of the ethyl cellulose in a solution of from 70 to 80 parts by weight of toluene with from 30 to 20 parts by weight of ethanol at 25° C. Low concentrations of the ethyl cellulose are effective although the ethyl cellulose may be employed in substantial proportions if desired. The proportion or concentration of the ethyl cellulose as used in solution with the meta-toluene diisocyanate may range from 0.03 gram to 15 grams for each 100 grams of the meta-toluene diisocyanate, the preferred concentration of the ethyl cellulose being from ½ to 6 grams for each 100 grams of the meta-toluene diisocyanate. The limits or proportions of the meta- toluene diisocyanate and the meta-toluene diisocyanate and ethyl cellulose solution as used in the reactant compositions of the invention will be later described.

The present invention provides for the incorporation of certain additives in the reactant foaming compositions to greatly increase the temperature resistance of the resultant cellular plastic product. These additives are substituted poly methylol phenols such as 2, 4, 6 trimethylol allyloxy benzene (a polymethylol phenol derivative manufactured by the General Electric Company and sometimes known as the General Electric Company's R-108 intermediate and as an allylated methylol phenol), other trimethylol phenols such as 2, 4, 6 trimethylol methoxy benzene; 2, 4, 6 trimethylol butoxy benzene and 2, 4, 6 trimethylol isopropoxy benzene and trimethylol phenol. The 2, 4, 6 trimethylol allyloxy benzene may be represented by the formula:

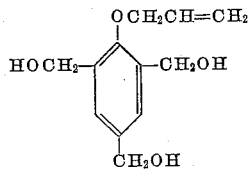

The additive for imparting the heat resisting characteristics to the cellular plastic reaction products is used in the reactant alkyd resin-polyisocyanate compositions in the proportion of from 20 parts by weight of the additive to each 100 parts by weight of the resin to 200 parts by weight of the additive to each 100 parts by weight of the resin. A preferred proportion is approximately 100 parts by weight of the additive to 100 parts by weight of the alkyd resin. While we do not wish to be limited to any particular theory of action or operation of the additives, it appears that at least two types of reaction may occur when the trimethylol phenol type of compound is present as a component in the alkyd resin polyisocyanate reactant system:

1. The addition of the methylol hydrogen to the isocyanate radical servies to make the additive an integral part of the alkyd-isocyanate polymer.
2. Water is split off at the elevated curing temperatures to form cross-linked methylene ether and methylene bridges similar to the curing mechanism of phenol-aldehyde condensates.

The polyisocyanate, preferably the meta-toluene diisocyanate or the meta-toluene diisocyanate-ethyl cellulose solution is incorporated in the reactant foaming compositions in the proportion range of from 65 parts by weight to 100 parts by weight total of the heat-resistance imparting additive and the alkyd resin to 165 parts by weight to 100 parts by weight total of the additive and the resin. It is usually preferred to employ 100 parts by weight of the meta-toluene diisocyanate or the meta-toluene diisocyanate and ethyl cellulose solution to 100 parts by weight total of the additive and alkyd resin.

Metallic powders may be incorporated in the foaming reactant mixtures to obtain cellular plastic products of improved physical properties. The metallic powders which we have found to be practical and effective include aluminum leafing powder, aluminum bronze leafing powder, gold bronze leafing powder, copper bronze leafing powder, lead leafing powder, nickle leafing powder, silver leafing powder, gold leafing powder, copper leafing powder, and stainless steel leafing powder. The metallic powders employed individually or in suitable mixtures may be employed in the proportion of from ⅟₁₆ to 7½ parts by weight for each 30 parts by weight of the alkyd resin component of the polyisocyanate-alkyd resin reactant composition. Good results have been obtained by employing aluminum leafing powder of such fineness that not more than 2% is retained on a Number 325 sieve and by using the other metal powders of such fineness that not more than 0.3% is retained on a Number 100 sieve.

Fillers of various kinds may be included in the polyisocyanate-alkyd resin and reactant mixtures or compositions. We have found that heat-resistant fillers, preferably of a fibrous nature such as glass fibers may be used in the various formulations of the invention to good advantage. Such fibrous fillers such as Pyrex fibers or leached fiberglass (SiO₂) fibers of from ⅟₃₂ to ½ inch long employed in the proportion of from ½ to 5 grams per 30 grams total of the alkyd resin and heat-resistance imparting additive have been found to materially increase the physical strength characteristics of the cellular plastic products.

We have obtained the best results when the water content of the alkyd-resin substituted poly methylol phenol system is from 0.1% or less to 2% by weight although the water content of this system may range from 0.1% or less to 5% by weight. In this connection it may be noted that the amounts or proportions of the meta-toluene diisocyanate or meta-toluene diisocyanate-ethyl cellulose solution required for satisfactory results are determined by the acid number of the alkyd-resin, its hydroxyl number, the water content of the resin-heat resistance imparting additive system, the ratio of the proportion by weight of the resin to the proportion by weight of the additive and the functionality of said additive with regard to its labile hydrogens.

The following are typical preferred examples of the formulations or reactant compositions of the invention for producing the heat-resistant cellular plastic products. In these examples the components are set forth in terms of parts by weight and the water content is in percentage by weight.

EXAMPLE 1

| | Parts |
|---|---|
| Resin B having an acid number of from 1 to 20 and a water content of from 0.1 to 1.5% | 20 |
| 2, 4, 6, trimethylol allyloxy benzene having from 0.05 to 1% water | 10 |
| Meta-toluene diisocyanate containing 6 grams ethyl cellulose having a viscosity of from 50 to 150 centipoises and having an ethoxyl content of from 46.8 to 49.5% per 100 grams of the meta-toluene diisocyanate | 30 |

In Example 1 the meta-toluene diisocyanate-ethyl cellulose solution may be employed in the proportion of from 25 to 35 parts by weight.

EXAMPLE 2

| | Parts |
|---|---|
| Resin C having an acid number of from 1 to 20 and a water content of from 0.05 to 1% | 15 |
| 2, 4, 6 trimethylol allyloxy benzene having from 0.05 to 2½% water | 15 |
| Distilled meta-toluene diisocyanate | 25 |
| Zinc stearate | 1 |

In Example 2 the meta-toluene diisocyanate component may be employed in the proportion of from 25 to 35 parts by weight and the zinc stearate soap powder in the proportion of from 1 to 2 parts by weight.

EXAMPLE 3

| | Parts |
|---|---|
| Resin C having an acid number of from 1 to 20 and a water content of 0.5% | 20 |
| 2, 4, 6 trimethylol allyloxy benzene having a water content of 0.1% | 10 |
| Meta-toluene diisocyanate containing 6 grams ethyl cellulose having a viscosity of from 7 to 100 centipoises and an ethoxyl content of from 46.8 to 48.5% per 100 grams of the meta-toluene diisocyanate | 30 |

EXAMPLE 4

| | Parts |
|---|---|
| Resin C having an acid number of from 1 to 20 and a water content of 0.2% | 20 |
| 2, 4, 6 trimethylol allyloxy benzene having a water content of 0.2% | 10 |
| Distilled meta-toluene diisocyanate | 25 |
| Aluminum leafing powder | 2 |

EXAMPLE 5

| | Parts |
|---|---|
| Resin A having an acid number of from 1 to 20 and a water content of from 0.1 to 1% | 15 |
| 2, 4, 6 trimethylol allyloxy benzene having a water content of from 0.05% to 1% | 15 |
| Meta-toluene diisocyanate containing 2 grams ethyl cellulose having a viscosity of from 50 to 150 centipoises and ethoxyl content of from 46.8% to 49.5% per 100 grams of the meta-toluene diisocyanate | 25 to 35 |

EXAMPLE 6

| | Parts |
|---|---|
| Resin A having an acid number of from 1 to 20 and a water content of from 0.05% to 1% | 15 |
| 2, 4, 6 trimethylol allyloxy benzene having a water content of from 0.05% to 1.5% | 15 |
| Milled Pyrex fibers from 1/32 to ½ inch long | ½ to 3 |
| Meta-toluene diisocyanate containing from 2 to 6 grams ethyl cellulose having a viscosity of from 7 to 150 centipoises and an ethoxyl content of from 45.0 to 49.5% per 100 grams of the meta-toluene diisocyanate | 25 to 35 |

EXAMPLE 7

| | Parts |
|---|---|
| Resin B having an acid number of from 1 to 20 and a water content of from 0.05% to 1% | 15 |
| 2, 4, 6 trimethylol allyloxy benzene having a water content of from 0.05 to 3% | 15 |
| Silica fibers from 1/32 to ½ inch long | ½ to 3 |
| Meta-toluene diisocyanate containing 6 grams ethyl cellulose having a viscosity of from 50 to 150 centipoises and ethoxyl content of from 45.0 to 49.5% per 100 grams of the meta-toluene diisocyanate | 25 to 40 |

EXAMPLE 8

| | Parts |
|---|---|
| Resin C having an acid number of 10 and a water content of 0.2% | 20 |
| 2, 4, 6 trimethylol allyloxy benzene having a water content of 0.5% | 10 |
| Number 422 aluminum leafing powder | 1 |
| Zinc stearate powder | ½ |
| Distilled meta-toluene diisocyanate | 25 |

It is to be understood that other polymethylol phenols may be substituted for the 2, 4, 6 trimethylol alloxy benzene in the above examples with similarly improved heat resistance characteristics in the cellular plastic product.

In the production of the cellular plastic materials or products of the invention, the selected ingredients are thoroughly mixed together in the ratios or proportions designed to produce a foamed plastic having the desired density, physical strength and other characteristics. The alkyd-resin and the heat resistance imparting additive may either be added to and mixed in the compositions separately or heat blended at a temperature not greater than 250° F. for approximately one hour and then mixed in the reactant composition as a blend. When the several ingredients have been properly mixed the resultant reactant composition is poured into the mold or into a cavity in the structure of which the cellular plastic mass is to form a part, or is applied in other manners. The composition is allowed to react at atmospheric pressure and in order to best develop the heat resisting properties of the cellular product it is subjected to a high temperature cure that is it is cured at a temperature of from 300° F. to 450° F. and preferably at from 350° F. to 450° F. for 2 to 10 hours. The plastic firmly and uniformly adheres to the surfaces of practically any solid material during the foaming reaction and retains its adherance when it has set and cured. The foamed cellular plastic materials have small cells that are spherical in configuration, that are substantially non-communicating and that are uniformly distributed throughout the mass.

The formulations of the invention when properly reacted and cured, result in products that are resistant to heat and remain hard and resistant to distortion at temperatures of 400° F. or higher. A comparison between two cellular alkyd-resin polyisocyanate reaction products will illustrate the unexpected manner in which the above described class of additives materially increases the heat-resistance of the products. For example we have found that a cellular plastic having a density of 10 pounds per cubic foot prepared from 120 grams of resin A and 102 grams of distilled meta-toluene diisocyanate containing 2 grams of ethyl cellulose having a vicosity of 100 centipoises and ethoxyl content of from 46.8% to 49.5% has an ultimate compressive strength of 100 p. s. i. at a temperatuer of 250° F. but is soft to the touch and easily distorted at 300° F. However, when 60 grams of 2, 4, 6 trimethylol allyloxy benzene is compounded or mixed with 60 grams of resin A and 120 grams of the same distilled meta-toluene diisocyanate ethyl cellulose solution the resultant cellular resin product of this composition after being cured at an elevated temperature has a density of 10 pounds per cubic foot and when tested in the same manner as the other product had an ultimate compressive strength of approximately 100 p. s. i. at a temperature of 350° F. and remained hard to the touch at temperatures above 400° F.

It should be understood that the invention is not necessarily based upon or dependent upon the theories which we have herein expressed. Nor is the invention to be regarded as limited to the express procedure or material set forth, these details being given only by way of illustration. We do not regard such specific details as essential to the invention except in so far as they may be expressed as limitations in the following claims wherein it is our intention to claim all novelty inherent in the invention as broadly as permission of the prior art.

We claim:

1. A cellular heat resistant plastic material which is the reaction product of an alkyd resin having an acid number of from 1 to 30 and wherein the hydroxyl and carboxyl groups in the alkyd resin reactants are in the ratio of from 4(OH):1(COOH) to 1½(OH):1(COOH), from 20 to 200 parts by weight of 2, 4, 6 trimethylol allyloxy benzene for each 100 parts by weight of the resin, and from 65 to 165 parts by weight of meta-toluene diisocyanate for each 100 parts by weight total of the resin and 2, 4, 6 trimethylol allyloxy benzene, the total water content of the resin and 2, 4, 6 trimethylol alloxy benzene being between 0.1% and 5%.

2. The cellular plastic material which comprises the reaction product of an alkyd resin having an acid number of from approximately 1 to 30 and wherein the hydroxyl and carboxyl groups in the alkyd resin reactants are in the ratio of 4(OH):1(COOH) to 1½(OH):1(COOH), a polymethylol phenolic compound selected from the group consisting of 2, 4, 6 trimethylol allyloxy benzene; 2, 4, 6 trimethylol methoxy benzene; 2, 4, 6 trimethylol butoxy benzene; 2, 4, 6 trimethylol isopropoxy benzene; and trimethylol phenol in the proportion of from 20 to 200 parts by weight to each 100 parts by weight of the resin, and from 65 to 165 parts by weight to each 100 parts by weight total of the resin and polymethylol phenolic compound of a polyisocyanate solution containing meta-toluene diisocyanate and from 0.03 gram to 15 grams of ethyl cellulose for each 100 grams of the metal-toluene diisocyanate, the ethyl cellulose having an ethoxyl content of from 43% to 50% and a viscosity of from 7 to 200 centipoises.

3. The cellular heat resistant plastic material which is the reaction product on an approximate weight basis; 20 parts of an alkyd resin having a water content of from 0.1 to 1.5% by weight and an acid number of from 1 to 20 prepared from approximately 4 mols trimethylol propane, approximately 2½ mols adipic acid and approximately ½ mol phthalic anhydride, 10 parts of 2, 4, 6 trimethylol allyloxy benzene containing from 0.05 to 1% water; and from 25 to 35 parts of a meta-toluene diisocyanate solution containing approximately 6% ethyl cellulose having an ethoxyl content of from 43% to 50% and a viscosity of from 7 to 200 centipoises.

4. The heat resistant cellular plastic material which is the reaction product on an approximate weight basis of; 15 parts of an alkyd resin having an acid number of from 1 to 20 and a water content of from 0.05 to 1% prepared from approximately 4 mols glycerol, approximately 2½ adipic acid and approximately ½ mol phthalic anhydride, 15 parts 2, 4, 6 trimethylol allyloxy benzene containing from 0.05% to 2½% water, from 25 to 35 parts meta-toluene diisocyanate and from 1 to 2 parts zinc stearate.

5. The heat resistant cellular plastic material which is the reaction product on an approximate weight basis of; 15 parts of an alkyd resin having an acid number of from 1 to 20 and a water content of from 0.1% to 1% prepared from approximately 4 mols trimethylol propane, approximately 1 mol adipic acid, approximately ½ mol phthalic anhydride and approximately ½ mol dimerized fatty acids, 15 parts 2, 4, 6, trimethylol allyloxy benzene having from 0.05% to 1% water, and from 25 to 35 parts of a meta-toluene diisocyanate solution containing approximately 2% ethyl cellulose having an ethoxyl content of from 43% to 50% and a viscosity of from 7 to 200 centipoises.

6. The heat resistant cellular plastic material which is the reaction product on an approximate weight basis of; 15 parts of an alkyd resin having an acid number of from 1 to 20 and a water content of from 0.1% to 1% prepared from approximately 4 mols trimethylol propane, approximately 1 mol adipic acid, approximately ½ mol phthalic anhydride and approximately ½ mol dimerized fatty acids, 15 parts 2, 4, 6 trimethylol allyloxy benzene having from 0.05% to 1% water, from ½ to 3 parts milled Pyrex fibers, and from 25 to 35 parts of a meta-toluene diisocyanate solution containing from 2% to 6% ethyl cellulose having an ethoxyl content of from 43% to 50% and a viscosity of from 7 to 200 centipoises.

7. The heat resistant cellular plastic material which is the reaction product on an approximate weight basis of; 15 parts of an alkyd resin having an acid number of from 1 to 20 and a water content of from 0.05 to 1% prepared from approximately 4 mols trimethylol propane, approximately 2½ mols adipic acid and approximately ½ mol phthalic anhydride; 15 parts 2, 4, 6 trimethylol allyloxy benzene containing from a fraction of 1% to 3% water, from ½ to 3 parts silica fibers and from 25 to 40 parts of a meta-toluene diisocyanate solution containing approximately 6% ethyl cellulose having an ethoxyl content of from 43% to 50% and a viscosity of from 7 to 200 centipoises.

8. A cellular heat resistant plastic material which is the reaction product of an alkyd resin having an acid number of from 1 to 30 and wherein the hydroxyl and carboxyl groups in the alkyd resin reactants are in the ratio of from 4(OH):1(COOH) to 1½(OH):1(COOH), from 20 to 200 parts by weight of 2, 4, 6 trimethylol allyloxy benzene for each 100 parts by weight of the resin, and from 65 to 165 parts by weight of a meta-toluene diisocyanate ethyl cellulose solution for each 100 parts by weight total of the resin and substituted polymethylol phenol, said solution containing from 0.03 gram to 15 grams of ethyl cellulose for each 100 grams of the meta-toluene diisocyanate, the ethyl cellulose having a viscosity of from 7 to 200 centipoises and an ethoxyl content of from 43% to 50%.

9. The cellular plastic material which comprises the reaction product of an alkyd resin having an acid number of from approximately 1 to 30 and wherein the hydroxyl and carboxyl groups in the alkyd resin reactants are in the ratio of 4(OH):1(COOH) to 1½(OH):1-(COOH), a polymethylol phenolic compound selected from the group consisting of 2, 4, 6 trimethylol allyloxy benzene; 2, 4, 6 trimethylol methoxy benzene; 2, 4, 6 trimethylol butoxy benzene; 2, 4, 6 trimethylol isopropoxy benzene; and trimethylol phenol in the proportion of from 20 to 200 parts by weight to each 100 parts by weight of the resin, and from 65 to 165 parts by weight of a meta-toluene diisocyanate-ethyl cellulose solution for each 100 parts by weight total of the resin and polymethylol phenolic compound, said solution containing from 0.50 gram to 6 grams of ethyl cellulose for each 100 grams of the meta-toluene diisocyanate, the ethyl cellulose having a viscosity of from 7 to 200 centipoises and an ethoxyl content of from 43% to 50%.

10. The cellular plastic material which comprises the reaction product of an alkyd resin having an acid number of from approximately 1 to 30 and wherein the hydroxyl and carboxyl groups in the alkyd resin reactants are in the ratio of 4(OH):1(COOH) to 1½(OH):1(COOH), a polymethylol phenolic compound in the proportion of from 50 to 150 parts by weight to each 100 parts by weight of the resin, and from 65 to 165 parts by weight of a meta-toluene diisocyanate-ethyl cellulose solution for each 100 parts by weight total of the resin and polymethylol phenolic compound, said solution containing from 0.03 gram to 15 grams of ethyl cellulose for each 100 grams of the meta-toluene diisocyanate, the ethyl cellulose having a viscosity of from 7 to 200 centipoises and an ethoxyl content of from 43% to 50.

11. The cellular plastic material which comprises the reaction product on an approximate part by weight basis of; 20 parts of an alkyd resin having an acid number of from 1 to 20 and a water content of from 0.1 to 1.5% by weight, 10 parts of 2,4,6 trimethylol allyoxy benzene, and from 25 to 35 parts of a meta-toluene diisocyanate solution containing approximately 6% by weight of ethyl cellulose having an ethoxyl content of from 43% to 50% and a viscosity of from 5 to 150 centipoises.

12. The cellular plastic material which comprises the reaction product of an approximate part by weight basis of; 20 parts of an alkyd resin having an acid number of from 1 to 20 and a water content of from 0.1 to 1.5% by weight, 10 parts of 2,4,6 trimethylol allyoxy benzene, and 30 parts of a meta-toluene diisocyanate solution containing approximately 6% by weight of ethyl cellulose having a viscosity of from 50 to 150 centipoises and an ethoxyl content of from about 46 to about 50.

13. The cellular heat resistant plastic material which is the reaction product of an approximate weight basis; 20 parts of an alkyd resin having a water content of from 0.1 to 1.5% by weight and an acid number of from 1 to 20 prepared from approximately 4 mols trimethylol propane, approximately 2½ mols adipic acid and approximately ½ mol phthalic anhydride, 10 parts of 2,4,6 trimethylol allyloxy benzene containing from 0.05 to 1% water; and from 25 to 35 parts of a meta-toluene diisocyanate solution containing approximately 6% ethyl cellulose having an ethoxyl content of from 43% to 50% and a viscosity of from 50 to 150 centipoises.

14. The cellular plastic comprising the reaction product on an approximate part by weight basis of; 15 parts of an alkyd resin having an acid number of from 1 to 20 and a water content of from 0.1 to 1% by weight, 15 parts of 2,4,6 trimethylol allyloxy benzene having a water content of from 0.05% to 1% by weight, and from 25 to 35 parts of a meta-toluene diisocyanate solution containing approximately 2% by weight of ethyl cellulose having an ethoxyl content of from about 46% to about 50% and a viscosity of from 7 to 200.

15. The cellular plastic material which comprises the reaction product of an alkyd resin having an acid number of from approximately 1 to 30 and wherein the hydroxyl and carboxyl group in the alkyd resin reactants are in the ratio of 4 (OH), : 1 (COOH) to 1½ (OH) : 1 (COOH), from 20 to 200 parts by weight to each 100 parts by weight of the resin of a polymethylol phenolic compound selected from the group consisting of 2,4,6 trimethylol allyloxy benzene, 2,4,6 trimethylol methoxy benzene, 2,4,6 trimethylol isopropoxy benzene, 2,4,6 trimethylol butoxy benzene, and trimethylol phenol and meta-toluene diisocyanate in the proportion of from 65 to 165 parts by weight to each 100 parts by weight total of the resin and polymethylol phenolic compound.

16. The cellular plastic material which comprises the reaction product of an alkyd resin having an acid number of from approximately 1 to 30 and wherein the hydroxyl and carboxyl groups in the alkyl resin reactants are in the ratio of 4 (OH), : 1 (COOH) to 1½ (OH) : 1 (COOH), a polymethylol phenolic compound selected from the group consisting of 2,4,6 trimethylol allyloxy benzene, 2,4,6 trimethylol methoxy benzene, 2,4,6 trimethylol isopropoxy benzene, 2,4,6 trimethylol butoxy benzene, and trimethylol phenol in the proportion of from 50 to 150 parts by weight to each 100 parts by weight of the resin, and meta-toluene diisocyanate in the proportion of from 65 to 165 parts by weight to each 100 parts by weight total of the resin and polymethylol phenolic compound.

17. The cellular plastic material which comprises the reaction product of an alkyd resin having an acid number of from approximately 1 to 30 and wherein the hydroxyl and carboxyl groups in the alkyl resin reactants are in the ratio of 4 (OH), : 1 (COOH) to 1½ (OH) : 1 (COOH), a polymethylol phenolic compound selected from the group consisting of 2,4,6 trimethylol allyloxy benzene, 2,4,6 trimethylol methoxy benzene, 2,4,6 trimethylol isopropoxy benzene, 2,4,6 trimethylol butoxy benzene, and trimethylol phenol in the proportion of from 20 to 200 parts by weight to each 100 parts by weight of the resin, and from 65 to 165 parts by weight of a meta-toluene diisocyanate-ethyl cellulose solution for each 100 parts by weight total of the resin and polymethylol phenolic compound, said solution containing from 0.50 to 6 grams of ethyl cellulose for each 100 grams of the meta-toluene diisocyanate, and ethyl cellulose having a viscosity of from 7 to 200 centipoises and an ethoxyl content of from 43% to 50%.

References Cited in the file of this patent

UNITED STATES PATENTS

| | | |
|---|---|---|
| 2,432,148 | Furness | Dec. 9, 1947 |
| 2,577,281 | Simon et al. | Dec. 4, 1951 |
| 2,591,884 | Simon et al. | Apr. 8, 1952 |

OTHER REFERENCES

Robitschek et al., Phenolic Resins, 1950, pages 42 and 43.